United States Patent [19]
Hosono et al.

[11] 4,341,205
[45] Jul. 27, 1982

[54] ENDOSCOPE

[75] Inventors: Saburo Hosono, Hino; Yoshihiko Miyamoto, Hachioji, both of Japan

[73] Assignee: Olympus Optical Co., Ltd., Tokyo, Japan

[21] Appl. No.: 222,373

[22] Filed: Jan. 5, 1981

[30] Foreign Application Priority Data

Jan. 17, 1980 [JP] Japan .................. 55-3800

[51] Int. Cl.³ ............................... A61B 1/06
[52] U.S. Cl. ....................... 128/6; 128/4; 128/303.15; 350/96.26; 350/61
[58] Field of Search ...................... 128/4–9; 350/61, 96.26

[56] References Cited

U.S. PATENT DOCUMENTS

| | | |
|---|---|---|
| 3,552,821 | 1/1971 | Cross . |
| 3,592,199 | 7/1971 | Ostensen .................. 128/6 |
| 4,063,796 | 12/1977 | Hiltebrandt .................. 350/70 |
| 4,216,767 | 8/1980 | Aoshiro .................. 128/6 |

FOREIGN PATENT DOCUMENTS

2062178 12/1970 Fed. Rep. of Germany .......... 128/4

*Primary Examiner*—Robert W. Michell
*Assistant Examiner*—Angela D. Sykes
*Attorney, Agent, or Firm*—Frishauf, Holtz, Goodman & Woodward

[57] ABSTRACT

An endoscope comprises a control section, an insertion section and a light guide cable both connected to the control section and provided with envelopes prepared from a heat-resistant and pressure-resistant material, a cavity extending throughout the insertion section, the control section and the light guide cable, and a protective liquid such as silicone oil whose volume little varies with pressure and temperature and which is filled in the cavity. The protective liquid supports in the cavity the envelopes of the insertion section and light guide cable which are exposed to a high pressure and temperature in an autoclave to prevent damage to the envelopes, thereby ensuring easy and reliable high pressure steam sterilization of the whole of the endoscope.

10 Claims, 4 Drawing Figures

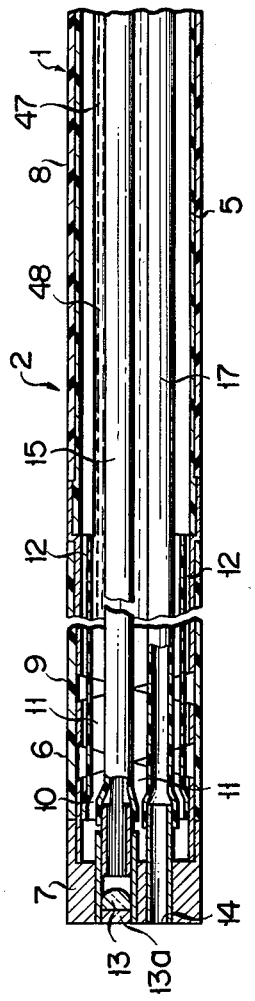
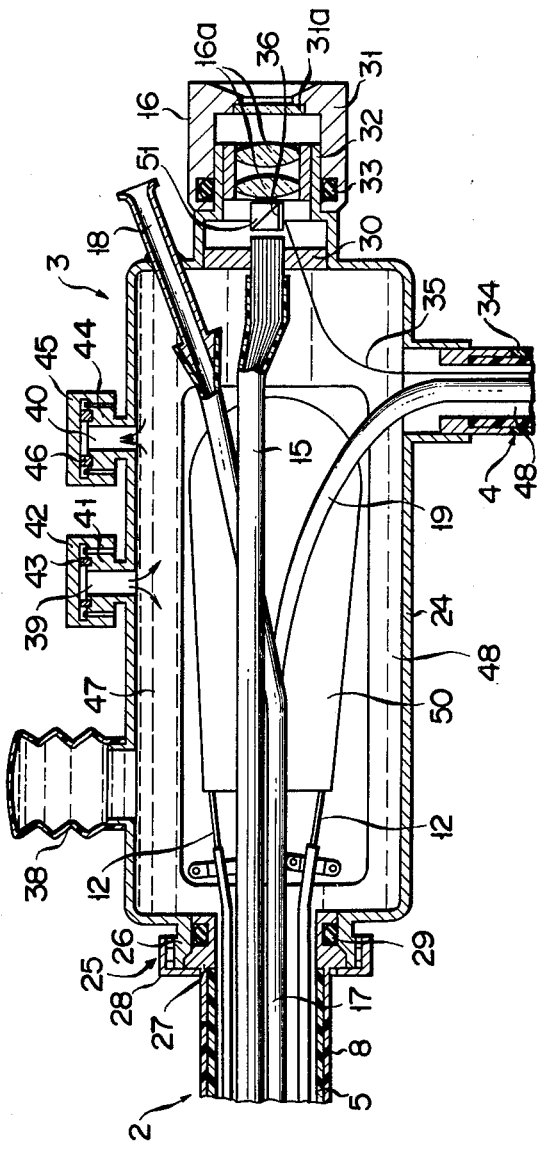

ENDOSCOPE

BACKGROUND OF THE INVENTION

This invention relates to an endoscope constructed for airtightness at the time of sterilization under high steam pressure.

When applied at normal temperature and under ordinary conditions, the conventional endoscope has its interior, except, for example, a fluid conduction channel, rendered airtight to prevent an external influx of liquid or air. Where no great difficulties are expected to arise, it well serves the purpose, if the whole of an endoscope is exposed to high pressure steam in an autoclave. In the case of high pressure steam sterilization, however, the pressure in the autoclave extends over a broad range from $-70$ cm Hg to 2 to 3 atmospheres, and a temperature prevailing in the autoclave rises to as high a level as 135° C. Therefore, possible drawbacks experienced with the conventional endoscope in the past were that the airtightness of the endoscope failed or the wall of the tubular insertion section was broken. Hitherto, therefore, the endoscope has been sterilized unavoidably by being dipped in a chemical solution, consuming a great deal of time and work.

It is accordingly the object of this invention to provide an endoscope whose interior is rendered airtight to prevent high pressure steam sterilization from harmfully affecting the endoscope.

SUMMARY OF THE INVENTION

To attain the above-mentioned object, this invention provides an endoscope which comprises a control section, an insertion section connected thereto, a light guide cable extending outward from the control section, a connector attached to the distal end of the light guide cable, a cavity extending throughout the control section, the insertion section, the light guide cable and the connector, a protective liquid which fills the cavity and whose volume is little likely to vary with pressure and temperature, and envelopes made of a high-resistant and pressure-resistant material and covering the insertion section and light guide cable, respectively. It is preferred that the protective liquid should be silicone oil.

The protective liquid supports in the above-mentioned cavity the envelopes of the insertion section and light guide cable exposed to high pressure and temperature in an autoclave, thereby preventing the breakage of the envelopes of the insertion section and light guide cable, and enabling the high pressure steam sterilization of the entire endoscope to be carried out.

BRIEF DESCRIPTION OF THE DRAWINGS

FIG. 1 is a longitudinal cross sectional view of an insertion section of an endoscope provided with part of an airtight construction embodying this invention;

FIG. 2 is a longitudinal cross sectional view a control section of an endoscope from which the insertion section of FIG. 1 extends, and which is provided with a main part of the aforesaid airtight construction;

DETAILED DESCRIPTION

Figure 3:
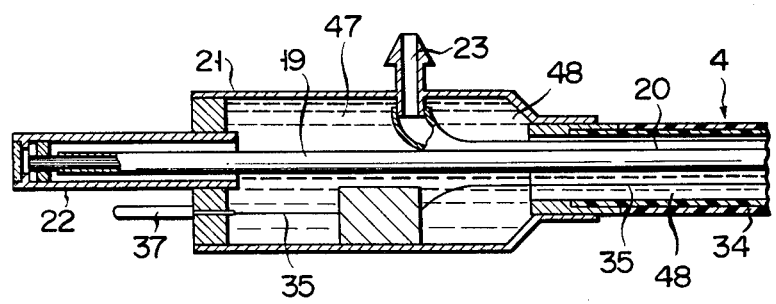
FIG. 3 is a longitudinal cross sectional view of a connector coupled to the distal end of a light guide cable extending outward from the lateral wall of the control section of FIG. 2.

Referring to FIGS. 1 to 3, an endoscope 1 comprises a substantially box-shaped control section 3, a tubular insertion section 2 extending outward from the distal end of a housing 24 of the control section 3, and a flexible light guide cable 4 extending outward from one lateral side of the housing 24 of the control section 3.

The insertion section 2 comprises a flexible tubular portion 5 whose proximal end is connected to the distal end of the housing 24 of the control section 3 and a rigid distal end portion 7 coupled to the distal end of the flexible tubular portion 5 by means of a tubular bend portion 6. The flexible tubular portion 5 and tubular bend portion 6 are enclosed in the corresponding flexible tubular envelopes 8, 9 in a liquid-tight state. The envelopes 8, 9 are formed of a material selected from those types of a group consisting of a fluorine resin, silicone resin, polyamide resin, urethane resin, polyethylene resin, polyester resin, fluorine-contained rubber, butyl rubber, ethylene propylene rubber and silicone rubber, which withstand a temperature up to 140° C. and a pressure ranging from $-70$ cm Hg to 2 to 3 atmospheres.

The tubular bend portion 6 is rendered flexible by being formed of a core member 10 which is constructed by pivotally connecting the mutually facing ends of a plurality of juxtaposed rings.

A plurality of (for example, two) operation wires 12 extend through the insertion section 2. The distal end of each operation wire 12 is connected to the foremost one of the rings 11 constituting the core member 10. The other end portion of the operation wire 12 extends through a bend control mechanism 50 of the tubular bend portion 6, set in the housing 24 of the control section 3. The bend control mechanism 50 is of the known type, and is operated by a knob (not shown) sealingly projecting outward from one lateral side of the housing 24 of the control section 3. Namely, the operation wire 12 is pulled or pushed according to the direction in which the knob is rotated, thereby causing the tubular bend portion 6 to be bent with a prescribed curvature and in a required direction.

The distal end portion 7 includes an objective 13, an observation window 13a, a channel opening 14, an illumination window (not shown) and a suction opening (not shown). The observation window 13a and the channel opening 14 are provided in the front end face of the distal end portion 7. The illumination window is set adjacent to the observation window 13a and in the front end face of the distal end portion 7, as known.

An image guide 15 formed of an optical fiber bundle extends through the insertion section 2 and the housing 24 of the control section 3. One end of the image guide 15 is optically connected to the objective 13. The other end of the image guide 15 is optically connected to the ocular 16a of an ocular section 16 provided on the proximal end of the housing 24 of the control section 3.

A channel tube 17 whose inner peripheral wall defines a channel, a light guide 19 formed of an optical fiber bundle and a suction tube 20 (FIG. 3) extend through the insertion section 2 and control section 3. The channel tube 17 is connected at one end to the channel opening 14 (FIG. 1), and at the other end to a forceps inlet 18 provided at the proximal end of the control section (FIG. 2). The light guide 19 is optically connected to the illumination window at its one end. The suction tube 20 is connected at one end to the suction opening of the distal end portion 7. Through the light guide cable 4 extend the light guide 19 and suction tube 20, starting with their intermediate part. The other end portions of the light guide 19 and the suction tube 20 extend in a connector 21 (FIG. 3) connected to the distal end of the light guide cable 4. The other end portion of the light guide 19 extends through a light guide tube 22 up to its end which projects from the distal end of the connector 21. The other end of the suction tube 20 is connected to a suction fitting 23 projecting outward from the lateral wall of the connector 21.

The housing 24 of the control section 3 and the flexible tubular portion 5 of the insertion section 2 communicate with each other, as later described, in an airtight state from the atmosphere by means of a coupling section 25 (FIG. 2).

The coupling section 25 comprises an annular receptacle 26 formed at the distal end of the housing 24 of the control section 3, an annular flange-shaped connection end portion 27 formed on the proximal end of the flexible tubular portion 5 for engagement with the receptacle 26, and a tightening ring 28 which is set on the receptacle 26, and, when rotated, causes the receptacle 26 to be tightened to the surface of the flange-shaped connected end portion 27, thereby ensuring a liquid-tight assembly. The tightening ring 28 and the receptacle 26 are connected together by threaded engagement, snap engagement or any other suitable engagement means. An O-ring 29 is provided between the receptacle 26 and flange-shaped connection end portion 27 to seal the intervening space.

Description is now given of the construction of the ocular section 16. A lens mount 32 for holding the ocular 16a is integrally formed at the proximal end of the housing 24 of the control section 3. The side of the lens mount 32 which faces the housing 24 of the control section 3 is closed by a circular support plate 30 which securely holds the other end portion of the image guide 15 which penetrates the plate 30. A diopter adjusting ring whose distal end is fitted with a glass cover 31a surrounds the lens mount 32. An O-ring 33 is set between the diopter adjusting ring 31 and the lens mount 32. The circular support plate 30 seals the interior of the lens mount 32 from the interior of the housing 24. The O-ring 33 and glass cover 31a seal the interior of the ocular section 16 from the atmosphere. The remaining parts of the diopter adjusting ring 31 are constructed in the same manner as in the known endoscope, description thereof being omitted.

The tubular envelope 34 of the light guide cable 4 is prepared from the same material as the envelopes 8, 9 of the flexible tubular portion 5 and tubular bend portion 6. Both ends of the light guide cable 4 are respectively connected to the lateral wall of the housing 24 of the control section 3 and the proximal end of the connector 21 in a liquid-tight state.

In the lens mount 32, a beam-splitting prism assembly 51 is provided between the proximal end of the image guide 15 and ocular 16a. The lateral wall of the prism assembly 51 is fitted with a photoelectric converting element 36 such as a photocell which senses one of two light fluxes obtained by dividing an incoming light beam by the prism assembly 51, that is, the reflected light flux by the prism assembly 51. Signal lines 35 for transmitting a signal sent forth from the converting element 36 extend in the housing 24 of the control section 3 and light guide cable 4 and are connected to connector pins 37 projecting outward from the distal end of the connector 21.

Bellows 38 communicating with the interior of the housing 24 of the control section 3 is projectively provided in a liquid-tight state on the opposite lateral wall of the housing 24 to that from which the light guide cable 4 extends outward. The bellows 38 is prepared from a pliable material resistant to the previously described pressure and temperature in order to be rendered easy to handle. That is, the material of the bellows 38 is selected from those types of a group consisting of fluorine resin, silicone resin, polyamide resin, urethane resin, polyethylene resin, polyester resin, fluorine-contained rubber, butyl rubber, ethylene propylene rubber and silicone rubber, which are pliable and resistant to the previously described pressure and temperature.

A protective liquid inlet fitting 41 and protective liquid outlet fitting 44 are projectively provided integrally with the housing 24 of the control section on the same side of the housing 24 as that on which the bellows 38 is set. The fittings 41, 44 are linearly arranged axially of the housing 24. The inlet fitting 41 is provided with a protective liquid inlet 39 communicating with the interior of the housing 24. The outlet fitting 44 is provided with a protective liquid outlet 40 similarly communicating with the interior of the housing 24. Normally, the inlet 39 and outlet 40 are covered with the corresponding caps 42, 45 by threaded or snap engagement. A packing 43 is provided between the cap 42 and inlet fitting 41. A packing 46 is provided between the cap 45 and outlet fitting 44. Provision of the packings 43, 46 renders the inlet fitting 41 and outlet fitting 44 liquid-tight.

The interior of the flexible tubular portion 5 and that of the light guide cable 4 communicate with the interior of the housing 24 of the control section 3. The flexible tubular portion 5 also communicates with the tubular bend portion 6. Therefore, the interior of the endoscope 1, except the ocular section 16, constitutes a continuous cavity 48. A liquid 47, for example, silicone oil whose volume little varies with the aforesaid pressure and temperature and whose chemical property does not change at a temperature of, for example, 135° C. (hereinafter referred to as the "protective liquid") is filled in the cavity 48 through the inlet 39. The outlet 40 allows for the release of air left in the cavity 48 of the endoscope 1, when it is filled with the protective liquid 47. The image guide 15, the channel tube 17, the light guide 19, the suction tube 20 and the signal lines 35 received in the endoscope cavity 48 are all immersed in the protective liquid 47 filled in the cavity 48.

Figure 4:
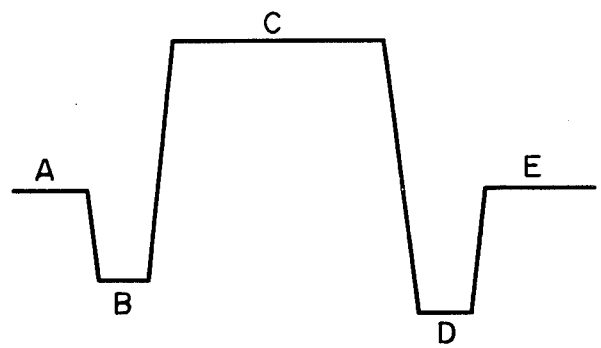
FIG. 4 shows a sterilization process carried out in an autoclave.

Description is now given of the process of sterilizing the endoscope 1 under high pressure steam. The high pressure steam sterilization is carried out by varying, as illustrated in FIG. 4, the internal condition of an autoclave in which the endoscope 1 is placed. The interior of the autoclave is initially set at the condition A representing the atmospheric pressure and room temperature. Then, the interior of the autoclave is evacuated and brought to the vacuum condition B of −50 to 60 cm Hg. Thereafter, high temperature steam is introduced into the autoclave, setting the autoclave interior at a pressurized state C of 2.2 to 2.4 atmospheres. The steam entering the autoclave is heated to a sufficiently high level of temperature to raise the temperature of the autoclave interior to 135° to 140° C. The entire endoscope 1 is sterilized at once by being held in such hot atmosphere for a prescribed length of time. Though varying with the size and shape of the endoscope 1, the retention time of the endoscope 1 generally runs about 5 to 20 minutes. Later, the pressure of the autoclave interior is reduced to about −70 cm Hg (the condition D) for evaporation of water. Last, air is brought into the autoclave to return the autoclave interior to the condition E denoting atmospheric pressure. The autoclave is opened to take out the endoscope 1.

During the high pressure steam sterilization, therefore, the endoscope 1 undergoes pressure varying from the substantially evacuated condition to a high level of pressure as 2.2 to 2.4 atmospheres.

The volume of air readily and widely varies with pressure. Where air occupies the endoscope cavity 48, the shapes of the control section 3, the distal end portion 7, the ocular section 16 and the connector 21 which are formed of a rigid material such as metal are not affected by changes in air pressure. However, the envelopes 8, 9 of the insertion section 2 and light guide cable 4 which are prepared, as previously described, from resin are little resistant to pressure, and, particularly when subjected to high pressure, are noticeably deformed, because air does not act as a medium for their support. Consequently these envelopes are ready to be cracked, crushed or broken.

With an endoscope embodying this invention, however, the endoscope cavity 48 is filled with the protective liquid 47 whose volume varies very little with pressure. Further, should a change take place in the volume of the protective liquid 47, the bellows 38 more pliable than the envelopes 8, 9 extends or contracts, thereby absorbing changes in the volume of the protective liquid 47. Accordingly, the envelopes 8, 9 are deformed to a minimum extent and saved from damage.

In the autoclave, temperature is changed from the room temperature to 135° to 140° C. However, the volume of the protective liquid 47 little varies with temperature. Moreover, the bellows 38 absorbs the volumetric variation of the protective liquid 47 resulting from temperature change, thereby preventing the damage of the envelopes 8, 9, 34.

The protective liquid 47, for example, the aforesaid silicone oil has a low heat conductivity, preventing the temperature of the endoscope cavity 48 from being raised to a high level, when the endoscope 1 is placed in the hot autoclave for steam sterilization. Therefore, elements little resistant to heat such as the image guide 15 and signal line 35 which are immersed in the protective liquid 47 can be saved from harmful effects of high heat.

With the foregoing embodiment, the bellows 38, the inlet 39, and the outlet 40 were formed on one lateral side of the control section 3. However, the present invention is not limited to this arrangement. These parts may be provided in any other suitable place, depending on, for example, the type of the endoscope used.

What we claim is:
1. An endoscope comprising:
   a control section having two ends;
   an insertion section which has two ends, one of them being fixed to one end of the control section, and which is further provided with an envelope prepared from a heat-resistant and pressure-resistant material;
   an ocular section which is formed at the other end of the control section and sealed from said control section and the atmosphere;
   an objective provided in the other end of the insertion section;
   a light guide cable which has two ends, one end being connected to the control section, and is provided with an envelope prepared from a heat-resistant and pressure-resistant material;
   a connector connected to the other end of the light guide cable;
   a cavity defined throughout the control section, the insertion section, the light guide cable and the connector and sealed from the atmosphere;
   an image guide which extends through the control section and the insertion section, and has two ends, one end being optically connected to the objective and the other end being optically connected to the ocular section;
   a light guide which extends through the cavity and has two ends, one end being disposed in the other end portion of the insertion section and the other end being connected to the connector; and
   a protective liquid whose volume little varies with pressure and temperature and is filled in the cavity.
2. The endoscope according to claim 1, which is provided with a bellows which extends outwardly from the endoscope and communicates with said cavity for absorbing changes in the volume of the protective liquid.
3. The endoscope according to claim 2, wherein said bellows is provided in the control section.
4. The endoscope according to claim 3, wherein said bellows is prepared from a material selected from those types of a group consisting of fluorine resin, silicone resin, polyamide resin, urethane resin, polyester resin, fluorine-contained rubber, butyl rubber, ethylene propylene rubber and silicone rubber, which are resistant to a temperature up to 140° C. and a pressure ranging from −70 cm Hg to 3 atmospheres.
5. The endoscope according to claims 1, 2, 3, or 4, which is provided with a protective liquid inlet and protective liquid outlet for causing said cavity to communicate with the atmosphere, and caps for detachably covering said protective liquid inlet and protective liquid outlet in a liquid-tight state.
6. The endoscope according to claim 5, wherein said protective liquid inlet and said protective liquid outlet are formed on the control section.
7. The endoscope according to claim 5, which comprises a protective liquid inlet fitting and a protective liquid outlet fitting in which the protective liquid inlet and the protective liquid outlet are respectively formed and which are covered with the caps.
8. The endoscope according to claim 7, wherein said protective liquid inlet fitting and said protective liquid outlet fitting are provided on the control section.
9. The endoscope according to claim 1, wherein the protective liquid is silicone oil.
10. The endoscope according to claim 1, wherein said envelopes of the insertion section and the light guide cable are prepared from a material selected from those types of a group consisting of fluorine resin, silicone resin, polyamide resin, urethane resin, polyethylene resin, polyester resin, fluorine-contained rubber, butyl rubber, ethylene propylene rubber and silicone rubber, which are resistant to a temperature up to 140° C. and a pressure ranging from −70 cm Hg to 3 atmospheres.

* * * * *

UNITED STATES PATENT AND TRADEMARK OFFICE
CERTIFICATE OF CORRECTION

PATENT NO. : 4,341,205

DATED : July 27, 1982

INVENTOR(S) : Saburo HOSONO, et al

It is certified that error appears in the above-identified patent and that said Letters Patent is hereby corrected as shown below:

COLUMN 6 (claim 4), line 34, after "bellows is" change "prepared" to --made--;

COLUMN 6 (claim 10), line 62, after "cable are" change "prepared" to --made--.

Signed and Sealed this

Ninth Day of November 1982

[SEAL]

Attest:

*Attesting Officer*

GERALD J. MOSSINGHOFF

*Commissioner of Patents and Trademarks*